(12) United States Patent
Suzuki et al.

(10) Patent No.: US 10,792,671 B2
(45) Date of Patent: Oct. 6, 2020

(54) OBJECT DISASSEMBLING APPARATUS

(71) Applicant: Panasonic Corporation, Osaka (JP)

(72) Inventors: Noriyuki Suzuki, Osaka (JP);
Genichiro Matsuda, Nara (JP); Syougo Utumi, Hyogo (JP); Yuichi Hata, Shiga (JP); Takao Namihira, Kumamoto (JP)

(73) Assignee: Panasonic Corporation, Osaka (JP)

( * ) Notice: Subject to any disclaimer, the term of this patent is extended or adjusted under 35 U.S.C. 154(b) by 652 days.

(21) Appl. No.: 15/601,991

(22) Filed: May 22, 2017

(65) Prior Publication Data
US 2017/0348700 A1    Dec. 7, 2017

(30) Foreign Application Priority Data

Jun. 2, 2016 (JP) ................................ 2016-111200
Nov. 15, 2016 (JP) ................................ 2016-222565

(51) Int. Cl.
 *B02C 19/18*    (2006.01)
 *B09B 3/00*    (2006.01)

(52) U.S. Cl.
 CPC ............. *B02C 19/18* (2013.01); *B09B 3/00* (2013.01); *B02C 2019/183* (2013.01)

(58) Field of Classification Search
 CPC ...... B02C 19/18; B02C 2019/183; B09B 3/00
 USPC ...................................................... 241/1, 301
 See application file for complete search history.

(56) References Cited

U.S. PATENT DOCUMENTS

| | | | |
|---|---|---|---|
| 4,313,573 A * | 2/1982 | Goldberger | B02C 19/18 241/1 |
| 4,401,543 A | 8/1983 | Ishizuka | |
| 4,671,860 A * | 6/1987 | Huddleston, Jr. | B01D 36/02 204/544 |
| 5,845,854 A | 12/1998 | Adam et al. | |
| 6,176,902 B1 | 1/2001 | Matsubara | |
| 6,489,585 B1 | 12/2002 | Nakamura et al. | |
| 2010/0212620 A1 | 8/2010 | Shimizu | |
| 2016/0082402 A1* | 3/2016 | Kitada | B01F 3/1242 241/1 |

FOREIGN PATENT DOCUMENTS

| | | | |
|---|---|---|---|
| EP | 3412363 A1 * | 12/2018 | B02C 19/18 |
| JP | 58-022385 | 2/1983 | |
| JP | 9-119283 | 5/1997 | |
| JP | 9-192526 | 7/1997 | |

(Continued)

OTHER PUBLICATIONS

The Extended European Search Report dated Oct. 26, 2017 for the related European Patent Application No. 17168668.6.

*Primary Examiner* — Shelley M Self
*Assistant Examiner* — Smith Oberto Bapthelus
(74) *Attorney, Agent, or Firm* — Panasonic IP Management; Kerry S. Culpepper

(57) ABSTRACT

A disassembling apparatus that shatters an object by means of pulsed discharge includes a container that can be filled with a liquid, an anode that is disposed within the container, a cathode that is disposed such that the object can be placed so as to straddle the anode and the cathode, object scattering prevention means that encloses an object disassembling region above the anode and the cathode, and a pulsed power supply that applies a high voltage pulse between the anode and the cathode.

13 Claims, 11 Drawing Sheets

(56) References Cited

FOREIGN PATENT DOCUMENTS

| JP | 10-235219 | 9/1998 |
| JP | 11-033430 A | 2/1999 |
| JP | 2001-102199 | 4/2001 |
| JP | 2011-034953 | 2/2011 |

\* cited by examiner

FIG. 4

| TEST CONDITION | NUMBER OF INTERMEDIATE ELECTRODES | DISTANCE BETWEEN EACH OF ELECTRODES [mm] | TOTAL OF DISTANCES BETWEEN ELECTRODES [mm] | NUMBER OF TIMES OF PULSED DISCHARGE REQUIRED FOR DISASSEMBLING [TIMES] |
|---|---|---|---|---|
| 1 | 0 | 5 | 5 | IMPOSSIBLE TO DISSEMBLE WITH 100 TIMES |
| 2 | 0 | 10 | 10 | 75 |
| 3 | 0 | 50 | 50 | 29 |
| 4 | 0 | 60 | 60 | DROPPED OUT DURING DISCHARGING |
| 5 | 1 | 5 | 10 | 79 |
| 6 | 1 | 10 | 20 | 48 |
| 7 | 1 | 30 | 60 | 21 |
| 8 | 1 | 50 | 100 | 5 |
| 9 | 1 | 55 | 110 | NO DISCHARGE |
| 10 | 2 | 10 | 30 | 41 |
| 11 | 2 | 20 | 60 | 25 |
| 12 | 2 | 30 | 90 | 8 |
| 13 | 2 | 40 | 120 | NO DISCHARGE |

OBJECT DISASSEMBLING APPARATUS

BACKGROUND

1. Technical Field

The present disclosure relates to an object disassembling apparatus that disassembles a board or an object including a board by causing pulsed power discharge in a liquid.

2. Description of the Related Art

A variety of types of work are necessary to recycle used home appliances. Since there is a need for separately disassembling a screw-fixing portion or a soldered portion which is in various forms when dismantling, automation is difficult and manual dismantling performed by workers has been the mainstream. A method for automatically and efficiently dismantling various used home appliances is required since manual dismantling has low work efficiency although flexibility in work is ensured.

A method for shattering by inputting an object, such as a rock and a concrete block, into a reactive container filled with a liquid and by causing pulsed discharge to occur between a ground classification electrode that is configured as a vibrating classification sieve provided in the liquid and a rod-shaped discharge electrode is described in Japanese Patent Unexamined Publication No. 9-192526.

FIG. 11 is a view illustrating a configuration of an object disassembling apparatus in the related art disclosed in Japanese Patent Unexamined Publication No. 9-192526. In the disassembling apparatus of FIG. 11, ground classification electrode 92, which is excited by oscillator 96 and is configured as a vibrating classification sieve that moves object 90 in an inclined longitudinal direction, is disposed so as to be immersed in water (W) within liquid tank 91. Above this ground classification electrode 92, rod-shaped discharge electrode 93, of which a tip is formed in a hemispherical shape, is pivotally supported by support shaft 94 provided at an upper portion of liquid tank 91 and is connected to high voltage pulse generator 95 outside liquid tank 91, and a tip portion facing the upper surface of ground classification electrode 92 is provided so as to rotate freely in a moving direction of object 90 on ground classification electrode 92. In this disassembling apparatus, when an object is continuously supplied, chunky object 90 that moves on ground classification electrode 92 is automatically brought into contact with the tip of discharge electrode 93 and can undergo pulsed discharge, and a rock or a concrete block, which is object 90, can be shattered.

SUMMARY

An object disassembling apparatus according to one aspect of the disclosure is a disassembling apparatus that shatters an object by means of pulsed discharge and includes a container which can be filled with a liquid, an anode which is disposed within the container, a cathode which is disposed within the container such that the object can be placed so as to straddle the anode and the cathode, object scattering prevention means which encloses an object disassembling region above the anode and the cathode, and a pulsed power supply which applies a high voltage pulse between the anode and the cathode.

As described above, when an object, for example, of which a housing is configured of an insulating material, is disassembled by being discharged in the liquid, the object disassembling apparatus according to the aspect of the disclosure prevents only a part of the object being locally disassembled due to discharge paths of pulsed discharge being concentrated at one place and thereby can disassemble the entire object into pieces in a targeted size with a certain number of times of discharge.

BRIEF DESCRIPTION OF THE DRAWINGS

FIG. 4 is a view illustrating results of evaluation on the number of times of discharge required for shattering a plastic case imitating a small home appliance when the number of intermediate electrodes according to exemplary embodiment 2 and a distance between electrodes are changed;

DETAILED DESCRIPTION

Prior to describing exemplary embodiments, problems of the related art will be briefly described.

Figure 11:
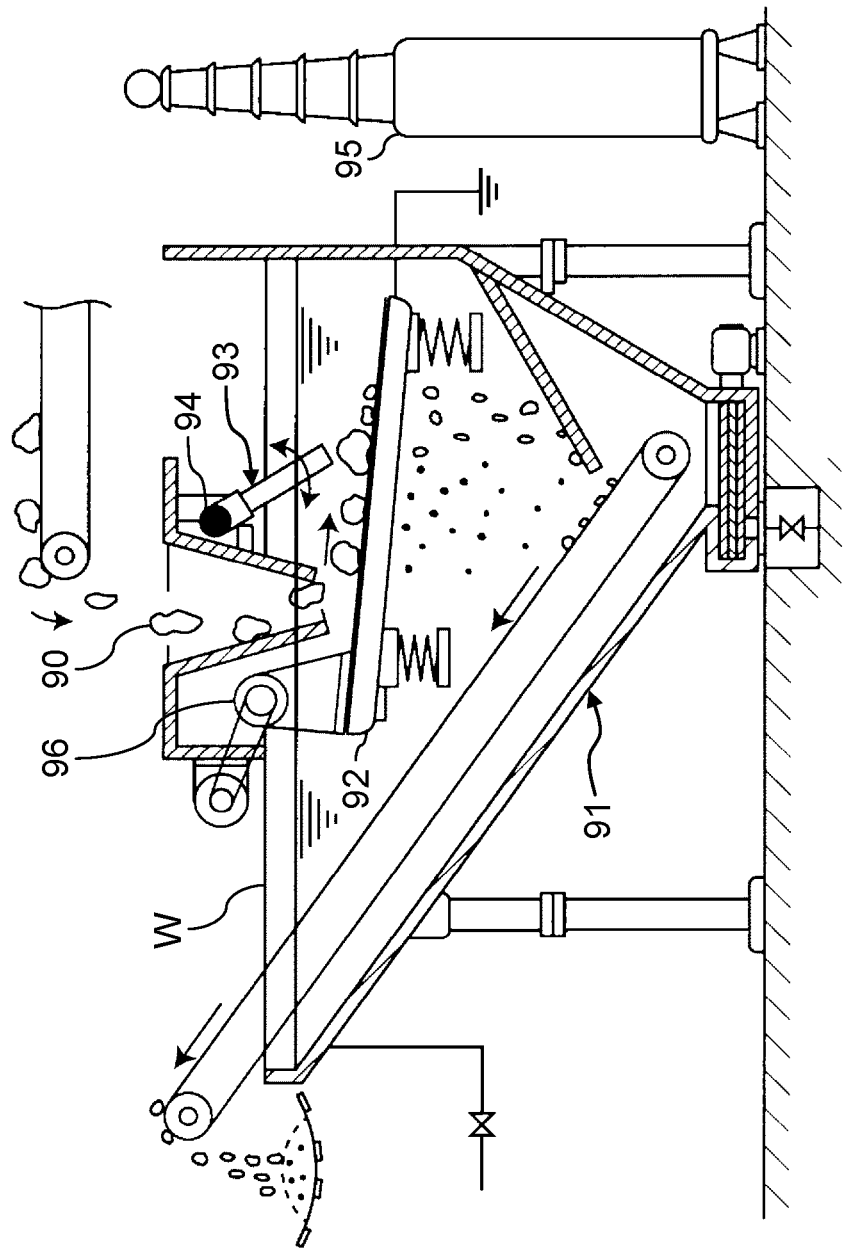
FIG. 11 is a schematic view of an object disassembling apparatus, which uses pulsed power discharge, according to the related art.

As illustrated in FIG. 11, since rod-shaped discharge electrode 93 comes into contact, from above, with an object, for example, a rock or a concrete and electronic products such as a mobile phone and a flat-screen television when processing is carried out with continuous discharging, the object is pressed down due to the weight of rod-shaped discharge electrode 93 and the object is fixed. As a result, since a part, at which the object comes into contact with ground classification electrode 92 and discharge electrode 93, becomes uniform and thus pulsed discharge occurs at the same place of the object, there is a problem in which the processed object is not disassembled or excessively disassembled.

Accordingly, an object of the disclosure is to solve the problem and to provide an object disassembling apparatus that can prevent only a part of the object being locally disassembled due to discharge paths of pulsed discharge being concentrated at one place, and disassemble the entire object into pieces in a targeted size with a certain number of times of discharge.

Hereinafter, exemplary embodiments will be described in detail with reference to the drawings.

An object disassembling apparatus according to the exemplary embodiments of the disclosure causes pulsed discharge to occur between electrodes that stand in a liquid and performs disassembling of an object by means of discharging or a shock wave induced by discharging.

Hereinafter, the exemplary embodiments will be described with reference to the drawings.

Exemplary Embodiment 1

Figure 1:
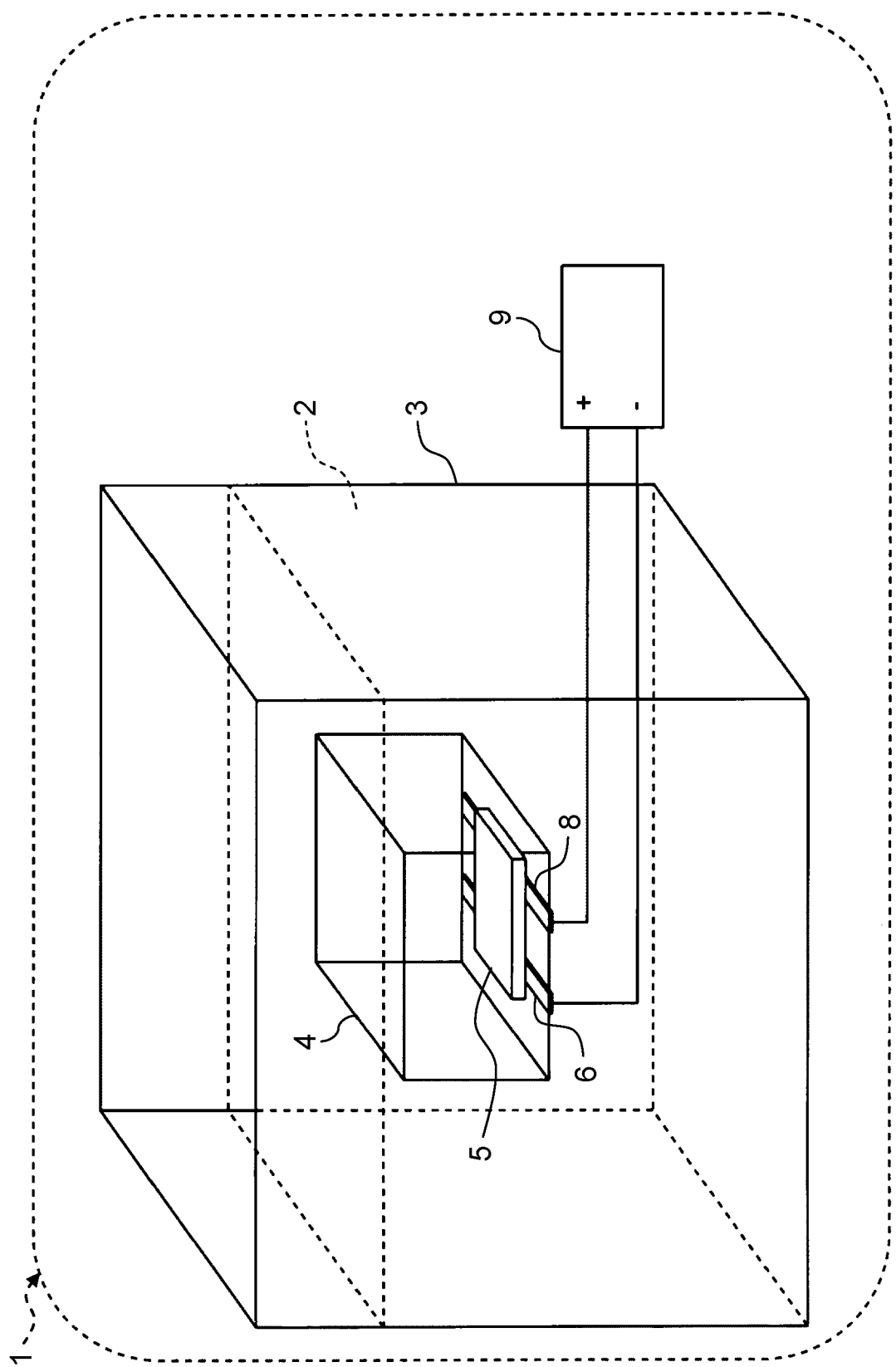
FIG. 1 is an overall schematic perspective view of an object disassembling apparatus, which uses pulsed power discharge, according to exemplary embodiment 1.

FIG. 1 illustrates an aspect of an object disassembling apparatus according to exemplary embodiment 1.

Object disassembling apparatus 1 is provided with container 3 filled with liquid 2, cathode 6, anode 8, pulsed power supply 9, and an enclosure case (scattering prevention means) 4.

Container 3 is, for example, a rectangular parallelepiped container, but the shape thereof is not limited thereto.

Cathode 6 and anode 8 are disposed in parallel with each other such that object 5, which is a target object to be disassembly-processed in liquid 2, is placed on upper surfaces of cathode 6 and anode 8 so as to straddle cathode 6 and anode 8.

Pulsed power supply 9 applies a high voltage pulse between anode 8 and cathode 6.

Scattering prevention means 4 is disposed so as to surround an object disassembling region above each of the upper surfaces of anode 8 and cathode 6 in order to prevent object 5 from being scattered and is configured in, for example, a rectangular parallelepiped box shape.

In FIG. 1, each of cathode 6 and anode 8 are in a rectangular flat rod shape or a plate shape having a regular width and have a rectangular section but the same effects can be achieved even if each section is in a circle or a polygon. In addition, although plates are illustrated in FIG. 1, cathode 6 and anode 8 may be a fence or a net.

A Marx generator that can apply any voltage up to 500 kV can be used as pulsed power supply 9. Surface discharge takes place along the lower surface of object 5 between anode 8 and cathode 6. Object 5, which is placed so as to straddle anode 8 and cathode 6, is disassembled due to discharging or a shock wave induced by discharging. At this time, due to surface discharge taken place on the lower surface of the object, drastic vaporization and expansion of liquid 2 occurs and object 5 flies up in liquid 2 when a force that pushes object 5 upwards is exerted. However, the movement of object 5 in an upward direction and in four directions, including, front, back, right, and left, is restricted and object 5 again falls on cathode 6 and anode 8 since there is scattering prevention means 4. The position or orientation of object 5 with respect to anode 8 and cathode 6 at the time of falling is different from that at the time of applying the previous pulsed discharge. In this state, since surface discharge keeps taking place along the lower surface of object 5, pulsed discharge occurs at different positions in object 5 and pulsed discharge can be restrained from occurring at the same place. Therefore, efficiently shattering object 5 and shattering the entire object into pieces in a targeted size are possible. In addition, since a shock wave necessary for fracturing object 5 is generated on the outer surface of object 5 due to surface discharge, the attenuation of fracture energy resulting from propagation of the shock wave can be restrained and object 5 can be efficiently fractured.

Accordingly, when object 5, for example, of which a housing is configured of an insulating material, is disassembled by being discharged in liquid 2, only a part of object 5 being locally disassembled due to discharge paths of pulsed discharge being concentrated at one place is prevented and thereby the entire object can be disassembled into pieces in a targeted size with a certain number of times of discharge.

Exemplary Embodiment 2

Figure 2:
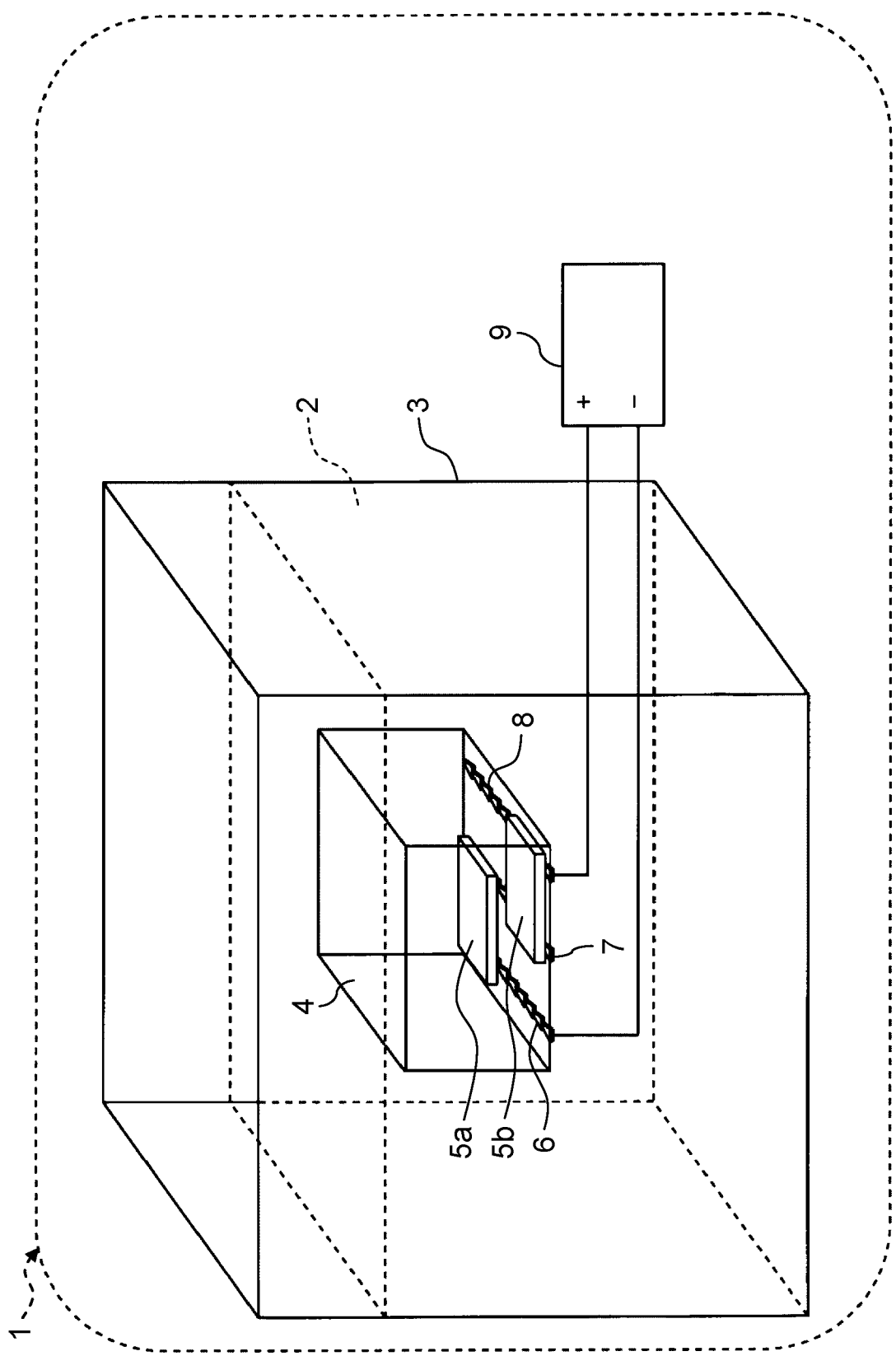
FIG. 2 is an overall schematic perspective view of an object disassembling apparatus, which uses pulsed power discharge, according to exemplary embodiment 2.

Compared to the apparatus of FIG. 1, an object disassembling apparatus according to exemplary embodiment 2 of FIG. 2 is a disassembling apparatus where the edges of each of cathode 6 and anode 8 that oppose another electrode are in a saw blade shape and electrically floating intermediate electrode 7 is added between cathode 6 and anode 8 at intervals. As an example, intermediate electrode 7 is disposed in parallel with cathode 6 and anode 8 and is in a rectangular flat rod shape or a plate shape having a regular width. Objects 5a and 5b can be placed so as to straddle intermediate electrode 7 and cathode 6, and intermediate electrode 7 and anode 8, respectively.

Since each of the edges of cathode 6, intermediate electrode 7, and anode 8 that oppose another electrode are in a saw blade shape in FIG. 2, an electric field is generated at a tip part of the saw blade, "dielectric breakdown", in which a current starts to flow in a material having low conductivity, is likely to occur due to application of a high voltage, and thereby stable discharge can occur.

Figure 3A:
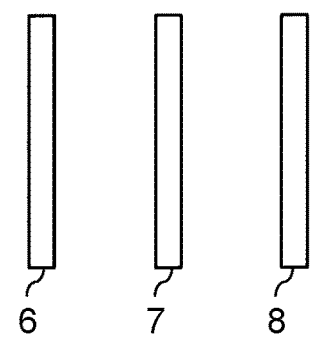
FIG. 3A is a view illustrating a combination of edges, which are in a saw blade shape, of each of electrodes according to exemplary embodiment 2.
Figure 3B:
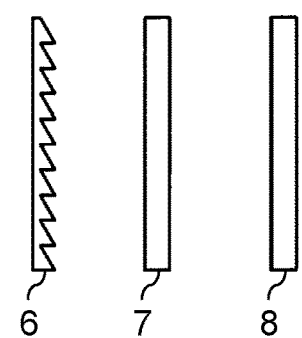
FIG. 3B is a view illustrating the combination of the edges, which are in a saw blade shape, of each of the electrodes according to exemplary embodiment 2.
Figure 3C:
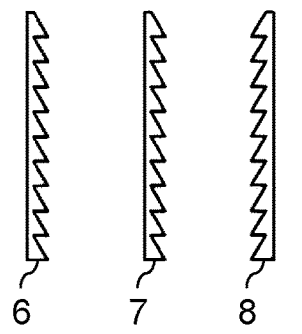
FIG. 3C is a view illustrating the combination of the edges, which are in a saw blade shape, of each of the electrodes according to exemplary embodiment 2.
Figure 3D:
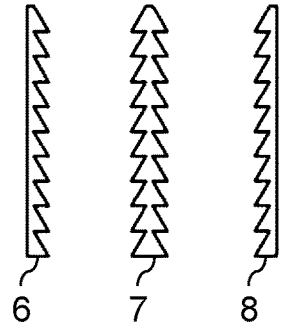
FIG. 3D is a view illustrating the combination of the edges, which are in a saw blade shape, of each of the electrodes according to exemplary embodiment 2.

FIG. 3A to FIG. 3D illustrate combinations of the edges of cathode 6, intermediate electrode 7 and anode 8 that are in a saw blade shape. FIG. 3A illustrates a case where all of the edges of cathode 6, intermediate electrode 7 and anode 8 that oppose another electrode do not have a saw blade shape. On the other hand, in FIG. 3B, one edge of cathode 6 that opposes intermediate electrode 7 is in a saw blade shape. Therefore, an electric field is generated between intermediate electrode 7 and cathode 6, and stable discharge can occur compared to the case of FIG. 3A. Furthermore, in FIG. 3C, both edges of intermediate electrode 7 and anode 8 that oppose each other are in a saw blade shape in addition to the shape of FIG. 3B. Therefore, an electric field, which is larger than the electric field between intermediate electrode 7 and cathode 6, is generated between intermediate electrode 7 and anode 8. Therefore, more stable discharge can occur than in FIG. 3B. Similarly, even with a combination that is not illustrated, stable discharge can be achieved when an electric field is more likely to be generated as the number of edges in a saw blade shape increases. In FIG. 3D, an electric field is most likely to be generated and the most stable discharge can occur since both of the edges of intermediate electrode 7 and cathode 6 that oppose each other are in a saw blade shape in addition to the shape of FIG. 3C and thereby all of the edges that oppose another electrode are in a saw blade shape. Even in a case where there is no edge having a saw blade shape, the same effect can be obtained by a sectional shape of an electrode, which is in a rod shape or a plate shape, being in a polygon such as a triangle since an electric field is generated in a vertex part of the section.

In addition, although a case where there is one intermediate electrode 7 has been illustrated in FIG. 2, there may be a plurality of intermediate electrodes 7. By providing intermediate electrode 7, a distance between each of electrodes can be decreased without changing a distance between anode 8 and cathode 6. The distance between each of electrodes should be determined by the sizes of objects 5a and 5b, which are target objects to be shattered, and a targeted shatter size. If objects 5a and 5b, which are target objects to be shattered, are larger than the distance between each of electrodes, objects 5a and 5b can be placed so as to straddle the electrodes and disassembly-processing can be carried out. In addition, if the size of the disassembled object is smaller than the distance between each of electrodes, the disassembled object falls downwards from between the electrodes. Therefore, by adjusting the distance between each of electrodes, it is possible to freely change a shatter size according to a target and it is possible to process objects having varied sizes. Alternatively, by making a distance between the anode and the cathode longer without changing a distance between each of electrodes, a distance at which dielectric breakdown occurs in surface discharge can be made longer, an even stronger shattering force can be applied to an object over a broader area, and it is possible to efficiently carry out shattering. In addition, in FIG. 2, when a pulsed voltage is applied between anode 8 and cathode 6, discharge occurs between anode 8 that is immediately below object 5b and intermediate electrode 7, and between intermediate electrode 7 that is immediately below object 5a and cathode 6. In other words, even in a case where a plurality of objects are not arranged in a straight line, it is possible to efficiently carry out disassembling since it is possible to cause discharging to occur immediately below each of the objects.

Next, a relationship between a distance between electrodes and a shattering force will be described. A disassembly-processing test was performed on a plastic case (sample 1) imitating a small home appliance, using the object disassembling apparatus illustrated in FIG. 2.

Conditions for producing sample 1 will be described in the followings.

Sample 1 was an ABS resin case having the size of 50×120×30 mm and a cover of the ABS resin case was fixed with four screws.

In the apparatus illustrated in FIG. 2, the object was discharged at a discharge voltage of 150 kV and a pulse frequency of 1 Hz and was disassembled. The electrodes including cathode 6, intermediate electrode 7, and anode 8 were 10 mm×200 mm. The test was performed with a distance between each of electrodes being changed within a range of 10 mm to 60 mm and the number of intermediate electrodes being three conditions of 0, 1, and 2.

Evaluation of the disassembling test on sample 1 was performed based on the number of times of pulsed discharge required for a housing of sample 1 to be disassembled or the cover to be removed. The results of evaluation are shown in FIG. 4.

Test condition 1 is a condition in which the total of distances between the electrodes is 5 mm, which is the shortest, and in this case, the housing could not be disassembled even though discharging was carried out 100 times. Under test conditions in which a total of distances between electrodes is equal to or larger than 10 mm, the housing could be disassembled, and the number of times of discharge required for disassembling tends to decrease as a total of distances between electrodes increases. Since a total of distances between electrodes is considered as a length at which dielectric breakdown occurs and surface discharge is caused, a total of distances between electrodes indicates that a fracturing force caused by discharging or a shock wave induced by discharging increases as a distance at which dielectric breakdown occurs becomes longer. Meanwhile, under test conditions 9 and 13, the totals of distances between electrodes were 110 mm and 120 mm, respectively, and discharging could not occur.

Hereinbefore, it has been found that under a condition where a voltage of 150 kV is applied in disassembling small home appliances, the housing can be disassembled in a case where a total of distances between electrodes is equal to or lager than 10 mm and is equal to or smaller than 100 mm, and efficient disassembling is performed when the total is set to approximately 100 mm. Since a dielectric breakdown distance is directly proportional to an applied voltage in general, a total of distances between electrodes should be determined according to a voltage to be applied.

It is preferable that a distance between each of electrodes be equal to or larger than 5 mm of test condition 5 under which the object could be disassembled. In addition, in the case of test condition 4 under which a distance between electrodes is 60 mm, the sample is dropped out during continuous discharging and the housing could not be disassembled since the distance between electrodes was too large. Hereinbefore, it is preferable that a distance between each of electrodes be equal to or larger than 5 mm and equal to or smaller than 50 mm.

Exemplary Embodiment 3

Figure 5:
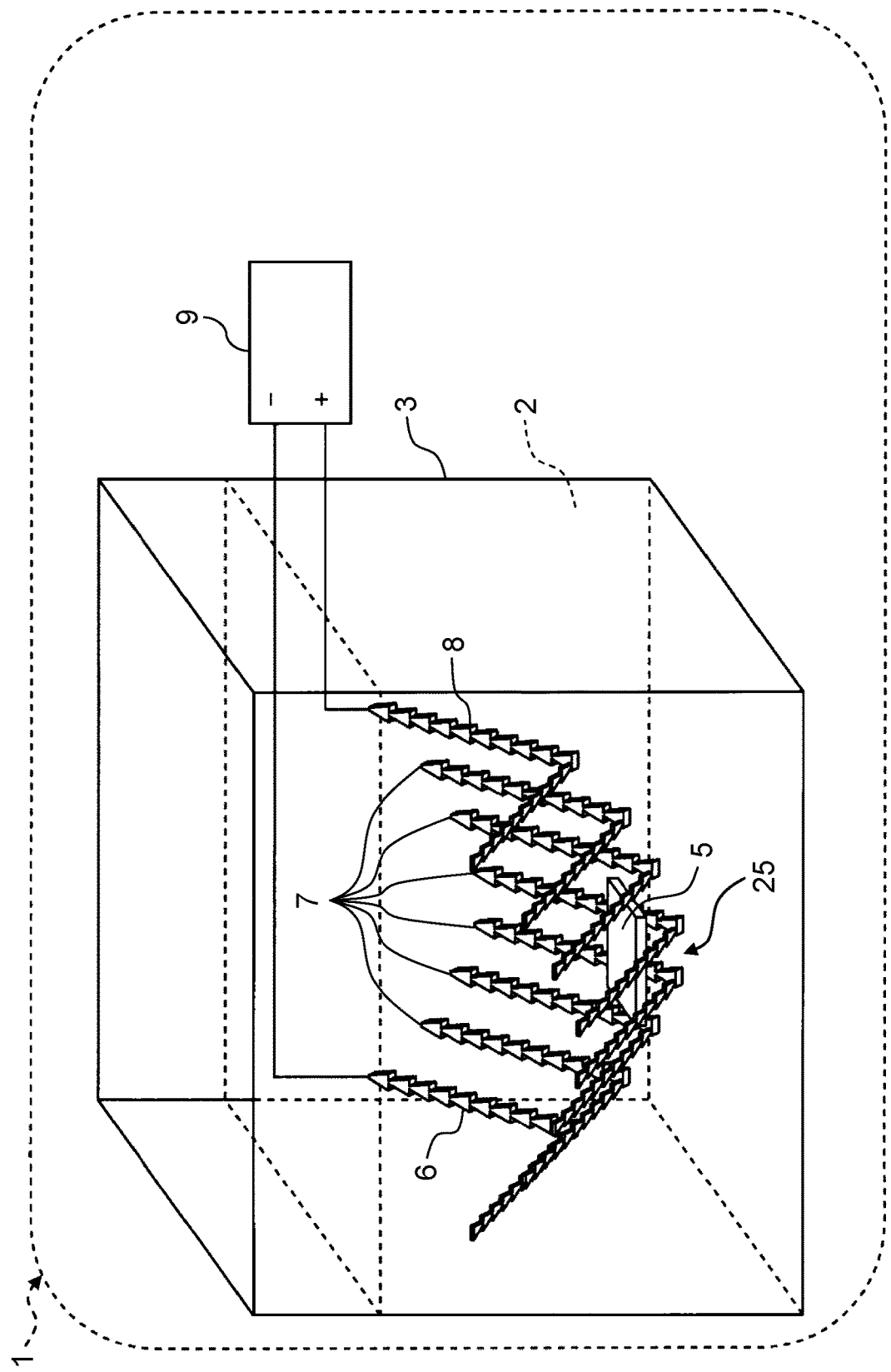
FIG. 5 is an overall schematic perspective view of an object disassembling apparatus, which uses pulsed power discharge, according to exemplary embodiment 3.

Compared to the apparatus of FIG. 2, an object disassembling apparatus according to exemplary embodiment 3 of FIG. 5 is a disassembling apparatus where each of the electrodes including cathode 6, intermediate electrode 7, and anode 8 are in a U-shape or a V-shape by intermediate portions thereof in a longer-side direction, for example, middle parts, being curved or bent in two directions and cathode 6, intermediate electrode 7, and anode 8 also serve as scattering prevention means 4 of FIG. 2.

In FIG. 5, cathode 6, intermediate electrode 7, and anode 8 also serve as scattering prevention means 4 by the V-shaped electrodes (cathode 6, intermediate electrode 7, and anode 8) being disposed so as to be convex downward. That is, both end portions of cathode 6, intermediate electrode 7, and anode 8, excluding the lower most portions of the intermediate portions, function as rod-shape scattering prevention members on the front side and back side of FIG. 5, and cathode 6 and anode 8 at left and right ends function as scattering prevention members on the left and right of FIG. 5 by being disposed above intermediate electrode 7. Accordingly, although object 5 flies up in liquid 2 from the position of lower most portion 25 when a force of pushing object 5 upwards is exerted by discharging an object 5 that has straddled cathode 6 or anode 8 and intermediate electrode 7 at the position of lower most portion 25, the movement of object 5 in the four directions, including front, back, right, and left, is restricted since there are V-shaped cathode 6, intermediate electrode 7, and anode 8. Thus, cathode 6, intermediate electrode 7, and anode 8 that have a V-shape and are disposed in a V-shape also serve as scattering prevention means 4. More specifically, cathode 6 is disposed at one end (for example, the left end) and anode 8 is disposed at the other end (for example, the right end) in FIG. 5. A plurality of intermediate electrodes 7, for example, six intermediate electrodes 7 are disposed between cathode 6 and anode 8 at intervals, two of six intermediate electrodes 7 at the center are positioned at the lowest, two intermediate electrodes 7 adjacent to these electrodes are disposed slightly higher, the rest two intermediate electrodes 7 adjacent to these electrodes are disposed even slightly higher, and cathode 6 and anode 8 that are adjacent to these electrodes are disposed slightly higher. Herein, the object is placed so as to straddle an area near intermediate electrode 7 in the middle and cathode 6 or anode 8 and discharging occurs. Although cathode 6, intermediate electrode 7, and anode 8 also serve as scattering prevention means for all of the four directions in such a case, a configuration where, for example, cathode 6, intermediate electrode 7, and anode 8 also serve as scattering prevention means only for the right and left may be adopted, and scattering prevention means having a plate shape may be additionally provided for the rest front and back directions. In this disassembling apparatus, there are a variety of discharge paths of the surface discharge that are generated on the outer surface of an object and it is possible to process the object more uniformly since the object is set such that both of the electrodes come into contact with not only the lower surface of the object but also side surfaces.

Exemplary Embodiment 4

Figure 6:
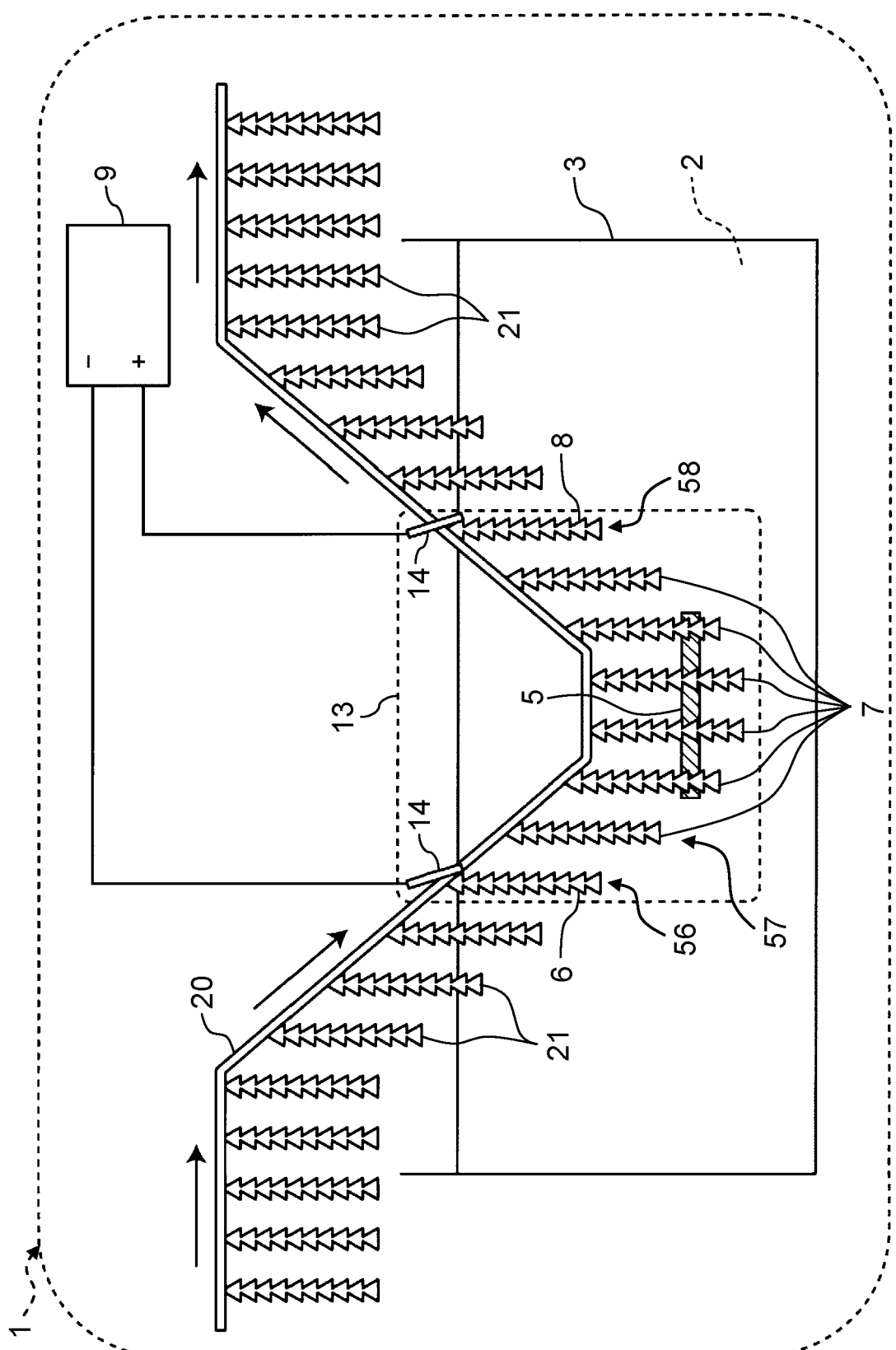
FIG. 6 is an overall schematic view of an object disassembling apparatus, which uses pulsed power discharge, according to exemplary embodiment 4.
Figure 7:
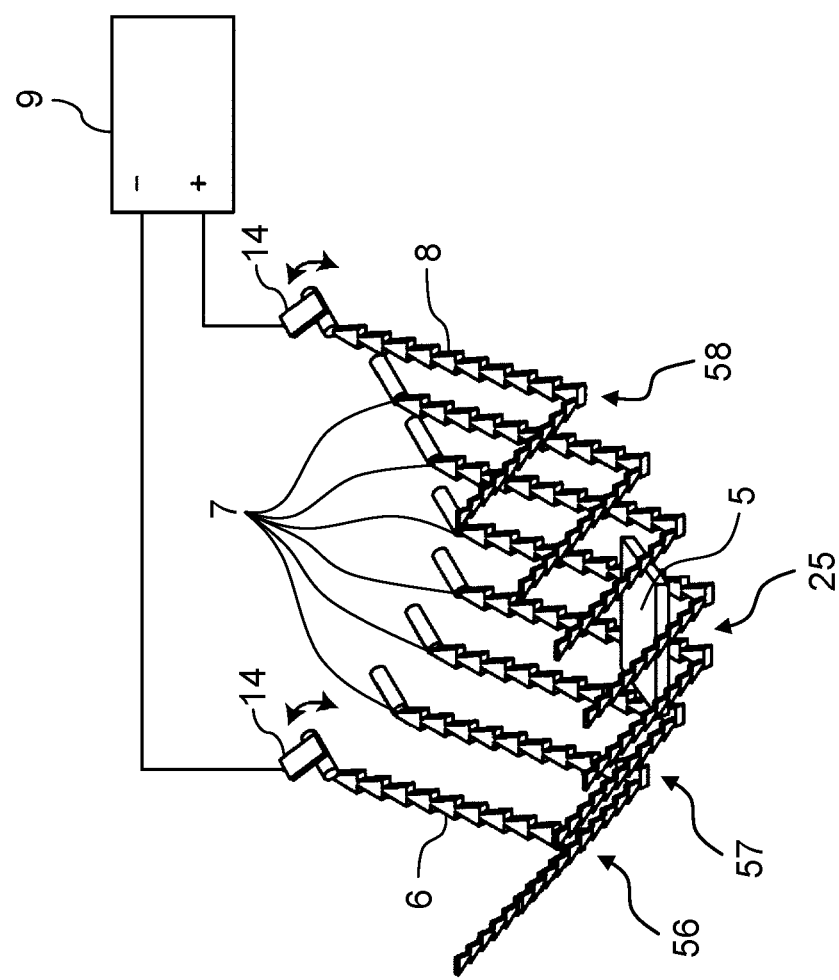
FIG. 7 is a perspective view of a voltage applier in the object disassembling apparatus, which uses pulsed power discharge, according to exemplary embodiment 4.

Compared to the apparatus of FIG. 5, an object disassembling apparatus according to exemplary embodiment 4 of FIG. 6 is a disassembling apparatus where a plurality of electrodes 21 are provided on insulating belt 20, which is a conveyor, so as to hang down in the same U-shape or V-shape in a direction perpendicular to a conveyor moving direction and continuous processing is possible. FIG. 7 is a perspective view of voltage applier 13 (refer to FIG. 6).

Both edges of each of electrodes 21 are in a saw blade shape.

With the conveyor-movement of belt 20, each of electrodes 21 that are positioned at anode position 58, cathode position 56, and intermediate electrode position 57 in voltage applier 13 function as anode 8, cathode 6, and intermediate electrode 7, respectively. Belt 20 moves such that the middle portion of intermediate electrode position 57 between anode position 58 and cathode position 56 shows a concave shape, which is a downward projection.

In FIG. 6 and FIG. 7, contact points 14 function as anode 8 and cathode 6, respectively, by contact points 14, of which one end rotates forward and reversely around the other end so as to come into contact with and separate from electrode 21, coming into contact with electrodes 21 positioned at anode position 58 and cathode position 56, respectively, with the conveyor-movement of belt 20. In addition, with the conveyor-movement of belt 20, electrode 21 positioned at intermediate electrode position 57 can function as intermediate electrode 7. Each of electrodes 21 are configured to be switched one by one between anode 8 and cathode 6 that are connected to pulsed power supply 9 and intermediate electrode 7 that is not connected to pulsed power supply 9 according to continuous movement or intermittent movement of belt 20 of the conveyor toward an arrow direction. This disassembling apparatus is capable of continuously inputting, processing, and collecting object 5 and is capable of significantly improving processing capacity.

Exemplary Embodiment 5

Figure 8:
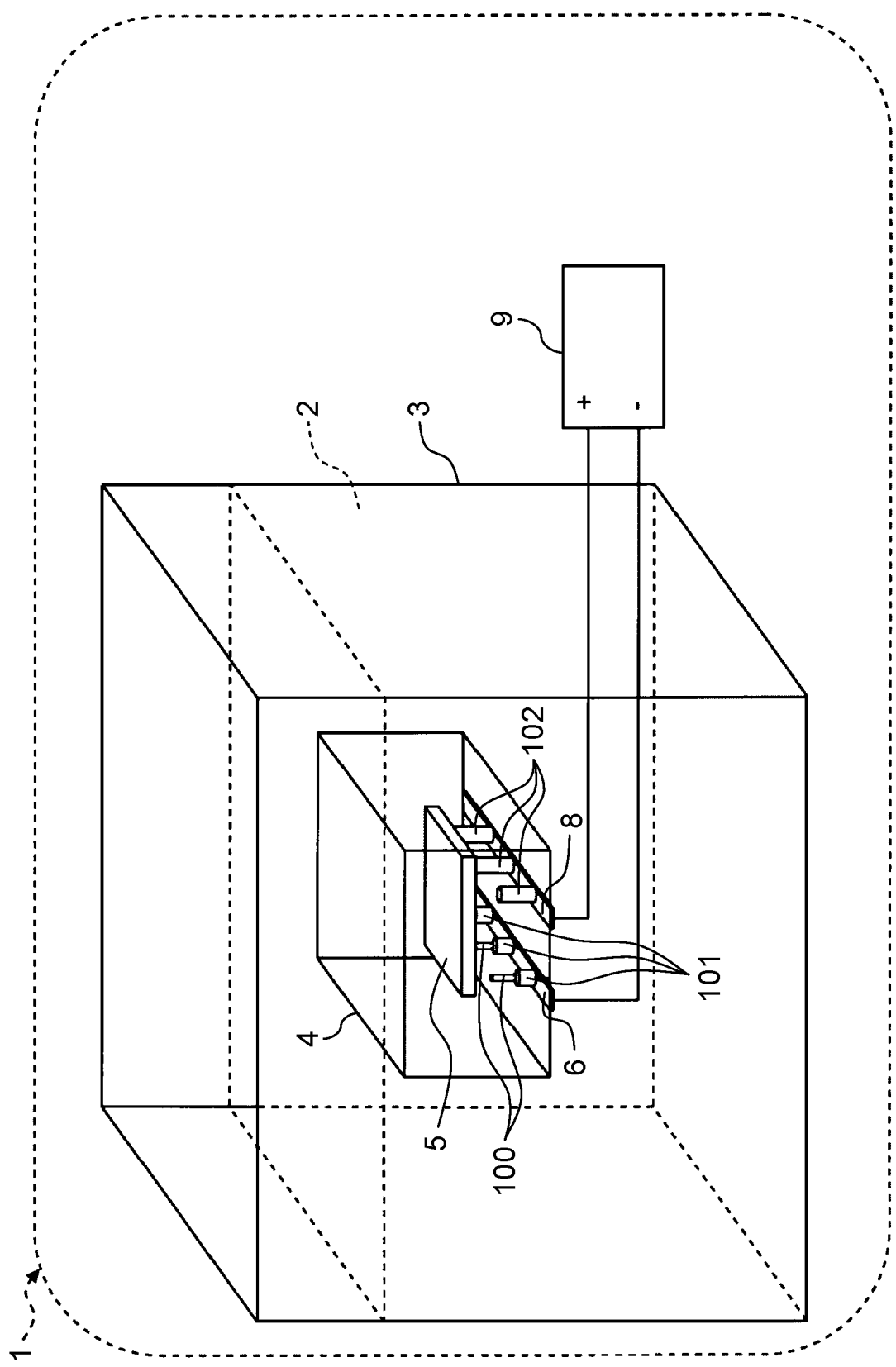
FIG. 8 is an overall schematic perspective view of an object disassembling apparatus, which uses pulsed power discharge, according to exemplary embodiment 5.

An object disassembling apparatus according to exemplary embodiment 5 of FIG. 8 has a different configuration from that of the apparatus of FIG. 1 in terms of the following points. That is, first, any one of anode 8 and cathode 6 is set to a first electrode and the other is set to a second electrode. In this state, for example, a plurality of cylindrical first protrusions 101 having conductivity are erected at intervals on the upper surface of the first electrode (for example, cathode 6 in FIG. 8) and, for example, cylindrical insulator spacer 100 is provided on the tip of each of first protrusions 101. With such a configuration, insulator spacer 100 and first protrusion 101 are disposed such that a part of the conductive first electrode (for example, conductive first protrusion 101) does not come into direct contact with object 5 by means of a plurality of insulator spacers 100. As an example, the diameter of first protrusion 101 is set to be larger than the diameter of insulator spacer 100, the upper end of first protrusion 101 protrudes from the lower end of insulator spacer 100 in a radial direction, and surface discharge which will be described later is likely to occur. As in the above description, since surface discharge is likely to occur, it is preferable to configure such that the outer shape of first protrusion 101 protrudes to the outside more than the outer shape of insulator spacer 100. As examples of protruding in such a manner, a case where the outer diameter of first protrusion 101 is larger than the outer diameter of insulator spacer 100, a case where the outer diameter of first protrusion 101 is equal to or smaller than the outer diameter of insulator spacer 100, and a case where the central axes of insulator spacer 100 and first protrusion 101 are shifted and first protrusion 101 protrudes from the lower end of insulator spacer 100 can be given. A plurality of cylindrical conductive second protrusions 102 protruding, for example, in the same direction as that of insulator spacer 100 are provided on the second electrode (for example, anode 8 in FIG. 8) and conductive second protrusions 102 are disposed so as to come into direct contact with object 5. With such a configuration, object 5 is placed so as to straddle insulator spacer 100 and second protrusion 102. A total of the height of cylindrical first protrusion 101 and the height of cylindrical insulator spacer 100 is approximately the same as the height of second protrusion 102 and object 5 is placed so as to straddle these members as illustrated in FIG. 8.

Each of insulator spacer 100, first protrusion 101, and second protrusion 102 are not limited to a cylindrical shape and may be in any shapes such as a prismatic shape and a tubular shape. In addition, the shape of the tip is not limited to a flat end surface and may be any shapes such as a sharp or curved needle shape. That is, the shape of the tip may be any shapes insofar as object 5 can be supported from below by insulator spacer 100 and second protrusion 102.

Figure 9:
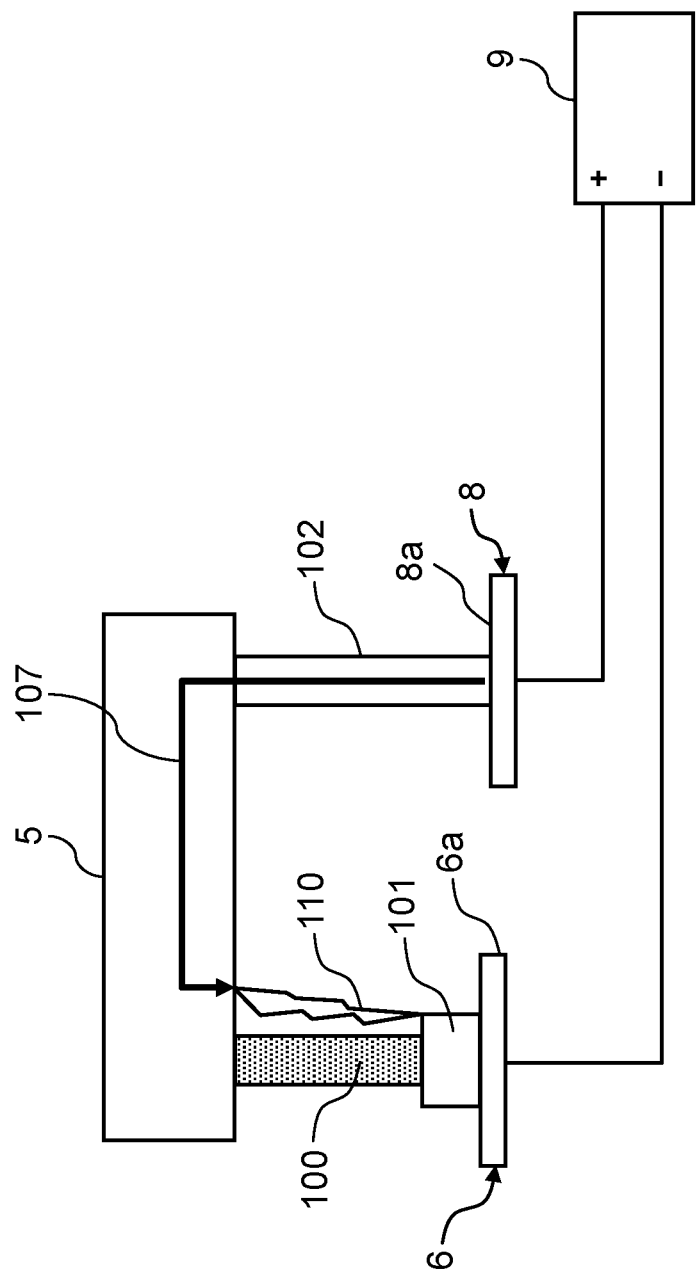
FIG. 9 is a view illustrating structure of electrodes and a spacer, and a discharge path, according to exemplary embodiment 5.

In FIG. 8 and FIG. 9, as an example, insulator spacers 100 are provided on cathode 6, the outer surface of object 5 and conductive first protrusions 101 of cathode 6 are disposed so as not to come into contact with each other, and anode 8 is disposed so as to come into contact with the outer surface of object 5 via conductive second protrusions 102. Instead of such an example, a structure, in which first protrusion 101 and insulator spacer 100 are provided on anode 8 and are disposed such that the outer surface of object 5 and conductive first protrusions 101 of anode 8 do not to come into contact with each other, and second protrusions 102 are provided on cathode 6 and are disposed such that second protrusions 102 come into contact with the outer surface of object 5, may be adopted.

FIG. 9 is a view illustrating the structure of cathode 6, anode 8, and insulator spacer 100 in the disassembling apparatus of FIG. 8 and discharge path 107. In FIG. 9, in a case where the outer surface of object 5 is made of a metal, shock wave 110 necessary for fracturing can be generated near the outer surface of object 5, which is a target to be processed, with a disposition where electric field concentration is caused between first protrusion 101, which is connected to insulator spacer 100 via cathode base portion 6a of cathode 6, and the outer surface of object 5, which is electrically connected to second protrusion 102 via anode base portion 8a of anode 8, and surface discharge occurs along the exterior surface of insulator spacer 100.

In the disassembling apparatus of FIG. 8, even if most part of the outer surface of object 5, such as a digital camera, is made of a metal, a short circuit between cathode 6 and anode 8 can be prevented and the reduction of the number of times of discharge is possible. Efficient disassembling of object 5 is possible since the discharge path is not concentrated such that object 5, which is a target to be processed, moves easily.

Exemplary Embodiment 6

Figure 10:
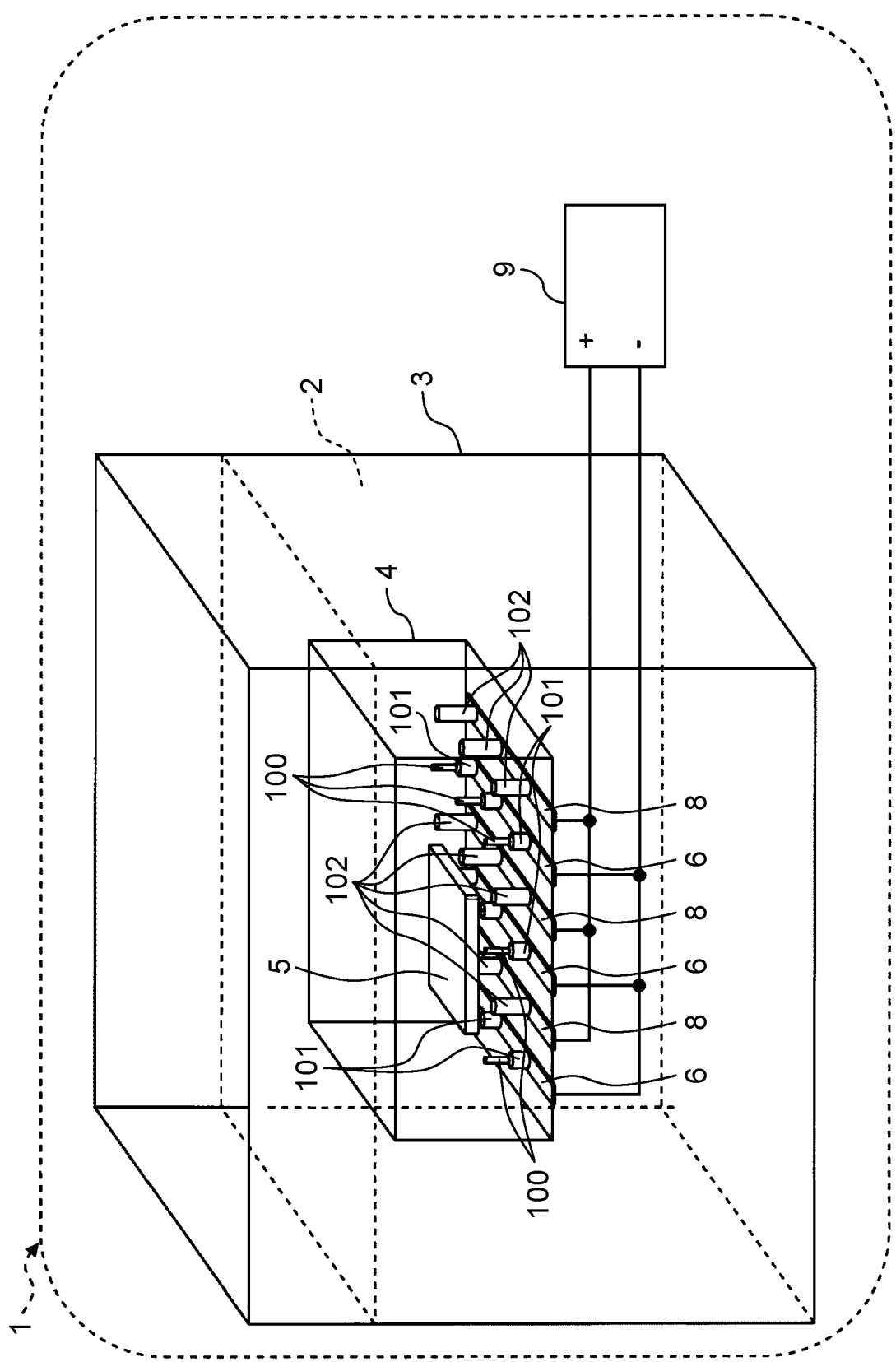
FIG. 10 is an overall schematic perspective view of an object disassembling apparatus, which uses pulsed power discharge, according to exemplary embodiment 6.

Compared to the disassembling apparatus of FIG. 8, in a disassembling apparatus for object 5 according to exemplary embodiment 6 of FIG. 10, cathodes 6 comprises a plurality of anodes and anodes 8 comprises a plurality of anodes, cathodes 6 and anodes 8 are alternately disposed at intervals, and each of all cathodes 6 and all anodes 8 are electrically connected to pulsed power supply 9. Efficient disassembling of object 5 is possible by setting a distance between cathode 6 and anode 8 and a distance between insulator spacer 100 and second protrusion 102 according to the size of object 5 and a targeted shatter size. When object 5 is larger than a distance between cathode 6 and anode 8 and a distance between insulator spacer 100 and second protrusion 102, object 5 can be placed so as to straddle cathode 6 and anode 8, and disassembly-processing can be carried out. In addition, when the size of the disassembled object is smaller than distances between cathode 6 and anode 8 and between first protrusions 101 of the electrode, the disassembled object falls downwards from between cathode 6 and anode 8. Therefore, it is possible to freely change a shatter size of object 5 according to a target and it is possible to process objects having varied sizes by adjusting a distance between cathode 6 and anode 8. In FIG. 10, when a pulsed voltage from pulsed power supply 9 is applied between anode 8 and cathode 6, discharging occurs immediately below object 5 via insulator spacer 100 in a case where the outer surface of object 5 is made of a metal. Accordingly, even in a case in which object 5 comes randomly and thus it is impossible to predict where object 5 will come above cathode 6 and anode 8, the disassembling of object 5 can be efficiently carried out since it is possible to cause discharge immediately below object 5.

In a case where object 5 is a digital camera of which most part of outer surface is made of a metal, the entire object could not be shattered to a desired shatter size with 200 times of discharge when the test was performed on the disassembling apparatus of FIG. 2, but the entire object could be shattered to a desired shatter size with 200 times of discharge in the disassembling apparatus of FIG. 10.

By appropriately combining any exemplary embodiments or modification examples out of the varied exemplary embodiments or modification examples, the effect of each exemplary embodiment or modification example can be achieved. In addition, a combination of exemplary embodiments, a combination of examples, or a combination of an exemplary embodiment and an example is possible and a combination of characteristics of different exemplary embodiments or examples is possible as well.

The object disassembling apparatus according to the aspect of the disclosure can be applied to small information home appliances including a mobile phone and a game console to be recycled since surface discharge, in which a current flows in the outer surface of the object, can occur through a variety of current paths and it is possible to effectively cause dielectric breakdown of a liquid important for disassembling in the case of an object of which a housing is configured of an insulating material such as plastic.

What is claimed is:

1. An object disassembling apparatus that shatters an object by a pulsed discharge, the disassembling apparatus comprising:
   a container that can be filled with a liquid;
   an anode that is disposed within the container;
   a cathode that is disposed within the container such that the object can be placed so as to straddle the anode and the cathode; and
   a pulsed power supply that applies voltage pulse between the anode and the cathode of 150 kV or greater or less than or equal to 500 kV at least one intermediate electrode that is disposed between the anode and the cathode so as to float electrically, wherein the object can be placed so as to straddle the anode and the intermediate electrode or the cathode and the intermediate electrode.

2. The object disassembling apparatus of claim 1, wherein at least one edge of the anode, the cathode, or the intermediate electrode that opposes one of the anode and the cathode has a saw blade shape.

3. The object disassembling apparatus of claim 2, wherein intermediate portions of the anode, the cathode, and the intermediate electrode in an elongated direction are disposed so as to be curved or bent.

4. The object disassembling apparatus of claim 3, wherein a plurality of electrodes are provided in a direction perpendicular to a moving direction on a conveyor belt, and
   the plurality of electrodes are moved from one of the anode and the cathode to the other of the anode and the cathode in order according to movement of the conveyor belt.

5. The object disassembling apparatus of claim 2, wherein a plurality of electrodes are provided in a direction perpendicular to a moving direction on a conveyor belt, and
   the plurality of electrodes are moved from one of the anode and the cathode to the other of the anode and the cathode in order according to movement of the conveyor belt.

6. The object disassembling apparatus of claim 1, wherein intermediate portions of the anode, the cathode, and the intermediate electrode in an elongated direction are disposed so as to be curved or bent.

7. The object disassembling apparatus of claim 6, wherein a plurality of electrodes are provided in a direction perpendicular to a moving direction on a conveyor belt, and
   the plurality of electrodes are moved from one of the anode and the cathode to the other of the anode and the cathode in order according to movement of the conveyor belt.

8. The object disassembling apparatus of claim 1, wherein a plurality of electrodes are provided in a direction perpendicular to a moving direction on a conveyor belt, and the plurality of electrodes are moved from one of the anode and the cathode to the other of the anode and the cathode in order according to movement of the conveyor belt.

9. An object disassembling apparatus that shatters an object by a pulsed discharge, the disassembling apparatus comprising:
a container that can be filled with a liquid;
an anode that is disposed within the container;
a cathode that is disposed within the container such that the object can be placed so as to straddle the anode and the cathode; and
a pulsed power supply that applies a voltage pulse between the anode and the cathode of 150 kV or greater or less than or equal to 500 kV and
wherein when any one of the anode and the cathode is set as a first electrode and the other is set as a second electrode,
the first electrode has a conductive first protrusion, an insulating spacer is provided on a tip of the first protrusion, and the object and the first electrode are disposed so as not to come into contact with each other by the spacer,
the second electrode has a conductive second protrusion that protrudes in the same direction as the first protrusion and the second protrusion is disposed so as to come into contact with the object, and
the object is placed so as to straddle the spacer and the second protrusion.

10. The object disassembling apparatus of claim 9, wherein the anode comprises a plurality of anodes and the cathode comprises a plurality of cathodes, the anodes and the cathodes are alternately disposed at intervals, and each of all the anodes and all the cathodes are electrically connected to the pulsed power supply.

11. The object disassembling apparatus of claim 1, further comprising an enclosure case that encloses an object disassembling region above the anode and the cathode.

12. An object disassembling apparatus that shatters an object by a pulsed discharge, the disassembling apparatus comprising:
a container that can be filled with a liquid;
an anode that is disposed within the container;
a cathode that is disposed within the container such that the object can be placed so as to straddle the anode and the cathode; and
a pulsed power supply that applies a voltage pulse between the anode and the cathode,
wherein the anode and the cathode each configured to have a V-shape wherein an intermediate portion is disposed lower than end portions of each of the anode and the cathode to define an object disassembling region above the anode and the cathode,
wherein the voltage pulse applied by the pulsed power supply between the anode and the cathode is 150 kV or greater or less than or equal to 500 kV.

13. An object disassembling apparatus that shatters an object by a pulsed discharge, the disassembling apparatus comprising:
a container that can be filled with a liquid;
an anode that is disposed within the container;
a cathode that is disposed within the container such that the object can be placed so as to straddle the anode and the cathode; and
at least one intermediate electrode which is disposed between the anode and the cathode, and electrically floats,
a pulsed power supply that applies a voltage pulse between the anode and the cathode,
wherein the anode, the cathode and the intermediate electrode, each configured to have a U-shape or a V-shape,
wherein the intermediate electrode is disposed lower than end portions of each of the anode and the cathode,
wherein the voltage pulse applied by the pulsed power supply between the anode and the cathode is 150 kV or greater or less than or equal to 500 kV,
wherein the anode, the cathode and the intermediate electrode function as a scattering prevention means for an object disassembled.

* * * * *